US010597279B2

(12) United States Patent
Standaert (10) Patent No.: US 10,597,279 B2
(45) Date of Patent: Mar. 24, 2020

(54) DRINK HOLDER (71) Applicant: CARDIFF GROUP, naamloze vennootschap, Zonhoven (BE)

(72) Inventor: Geert Norbert R. Standaert, Zonhoven (BE)

(73) Assignee: CARDIFF GROUP, naamloze vennootschap, Zonhoven (BE)

(*) Notice: Subject to any disclaimer, the term of this patent is extended or adjusted under 35 U.S.C. 154(b) by 40 days.

(21) Appl. No.: 15/754,159

(22) PCT Filed: Aug. 22, 2016

(86) PCT No.: PCT/BE2016/000042
§ 371 (c)(1),
(2) Date: Feb. 21, 2018

(87) PCT Pub. No.: WO2017/031558
PCT Pub. Date: Mar. 2, 2017

(65) Prior Publication Data
US 2019/0010043 A1 Jan. 10, 2019

(30) Foreign Application Priority Data
Aug. 25, 2015 (BE) .................. 2015/5530

(51) Int. Cl.
B67D 1/04 (2006.01)
B67D 1/08 (2006.01)

(52) U.S. Cl.
CPC ......... B67D 1/0462 (2013.01); B67D 1/0804 (2013.01); B67D 1/0805 (2013.01);
(Continued)

(58) Field of Classification Search
CPC .. B65D 1/0462; B65D 1/0804; B65D 1/0801; B65D 1/08; B65D 1/0805; B65D 1/0807;
(Continued)

(56) References Cited

U.S. PATENT DOCUMENTS 2,054,754 A * 9/1936 Kellogg ................. B65D 7/045
220/592.19
5,169,019 A * 12/1992 Budenbender ......... B65D 77/06
220/495.08

(Continued)

FOREIGN PATENT DOCUMENTS

EP 2 154 102 A1 2/2010
WO 2005/113413 A1 12/2005

OTHER PUBLICATIONS

International Search Report, dated Feb. 23, 2017, from corresponding PCT application No. PCT/BE2016/000042.

Primary Examiner — Robert J Hicks
(74) Attorney, Agent, or Firm — Young & Thompson (57) ABSTRACT Holder for beverages, whereby the holder includes a rigid outer holder that is provided with a mouth for inserting a flexible inner holder, whereby the holder also includes an adapter, that is designed to be provided on the mouth and which is designed to be coupled to a coupling element of such an inner holder, so that in this way an inner holder, with a coupling element that is too small to be provided on the mouth directly, can nonetheless be provided on the mouth. The outer holder and the adapter are fitted with a complementary first unit to lock their mutual position when they are coupled, whereby the locking is repeatedly reversible.

10 Claims, 8 Drawing Sheets (52) U.S. Cl.
CPC ......... *B67D 1/0807* (2013.01); *B67D 1/0835* (2013.01); *B67D 1/0848* (2013.01); *B67D 1/0845* (2013.01); *B67D 1/0847* (2013.01); *B67D 2001/0828* (2013.01)

(58) Field of Classification Search
CPC .. B65D 1/0835; B65D 1/0831; B65D 1/0829; B65D 1/0848; B65D 1/0845; B65D 1/0847; B65D 11/08; B65D 11/06; B65D 7/02; B65D 7/045; B65D 51/145; B65D 45/24; B65D 50/046; B65D 50/041; B65D 47/122; B65D 47/12; B67D 1/0462; B67D 1/0804; B67D 1/0801; B67D 1/08; B67D 1/0805; B67D 1/0807; B67D 1/0835; B67D 1/0831; B67D 1/0829; B67D 1/0848; B67D 1/0845; B67D 1/0847
USPC .............. 220/601, 4.04, 723, 722, 721, 720; 251/316; 215/313, 314, 311, 283, 280, 215/276, 274, 217, 223; 222/562, 545, 222/544
See application file for complete search history.

(56) References Cited

U.S. PATENT DOCUMENTS

| | | | | |
|---|---|---|---|---|
| 5,217,138 A | * | 6/1993 | Nichols | B65D 25/16 220/495.06 |
| 5,392,967 A | * | 2/1995 | Satomi | B65D 47/248 222/509 |
| 6,510,959 B1 | * | 1/2003 | Van Newenhizen | B65D 90/046 220/327 |

* cited by examiner

DRINK HOLDER

The present invention relates to a drink holder.

More specifically the invention is intended for a beer keg.

In particular the invention concerns reusable beer kegs. After use these reusable beer kegs generally contain beer residues and thus have to be thoroughly cleaned and disinfected. This is a lot of work that has to be done in a number of steps.

The cleaning can be automated, but technically complex machines with a high cost price are required for this, such that for smaller breweries with a relatively small production in particular it contributes a great deal to the cost per filled beer keg.

It is possible to work with a reusable outer keg with a relatively cheap, replaceable inner holder that is intended for single use and which is essentially made of plastic.

However, the problem arises here that the inner holder can be damaged if the mouth of the outer holder through which the inner holder has to be inserted is relatively small, because the inner holder then scrapes against the mouth during insertion.

This a particular problem when inserting the inner holder by machine.

After use the inner holder has to be taken out of the outer holder again. It is often still partially filled with beer or propellant, and in any case is not as compact as during insertion. When removing the inner holder through a relatively small mouth a substantial force thus to be applied and there is a very high risk of damage, so that the outer holder is fouled with old, and possibly contaminated, beer.

However, it is desirable to make the coupling element to the inner holder as small as possible. This is because, on the one hand, the inner holder is intended for single use and thus must be as small as possible in order to use less material. This is made worse because relatively high quality plastic must be used to be able to withstand the forces of a pressurised keg, and diverse conditions with regard to temperature, humidity and UV exposure.

On the other hand, due to the pressure in the beer keg during use a larger coupling element can deform, such that shutoff valves, which are also in the coupling element, could work less well, if at all.

With a larger coupling element the storage and transport thereof also entails a higher cost.

A further problem is that the coupling element also has to be equipped to be coupled to a beer tap installation. A number of standardised couplings are known for this. Different models of inner holder with coupling element thus have to be made and kept in stock, which is also detrimental for the cost price.

The purpose of the present invention is to provide a solution to the aforementioned and other disadvantages by providing a drink holder, whereby the holder comprises a rigid outer holder that is provided with a mouth for inserting a flexible inner holder, whereby the holder also comprises an adapter that is designed to be provided on the mouth and which is designed to be coupled to a coupling element of such an inner holder, so that in this way an inner holder, with a coupling element that is too small to be provided on the mouth directly, can nonetheless be provided on the mouth, whereby the outer holder and the adapter are fitted with complementary first means to lock their mutual position when they are coupled, whereby the locking is repeatedly reversible, i.e. can be opened and applied again without damage.

Locked here means that the mutual position cannot be changed just like that, for example in the case of a screw thread by means of a screw movement, but that this position is fixed by the lock until the lock is opened or broken.

Such an adapter enables the contradictory requirements of a large mouth for the easy insertion of a flexible inner holder, and a small coupling element for cost and strength considerations, to be combined.

A further advantage is that the outer holder and the adapter cannot move with respect one another, which could cause damage to the inner holder during use, and which could yield a hazard if the adapter comes loose from the outer holder when the holder is pressurised.

If this lock can only be removed with specialised tools, it can also prevent consumers from making changes to the holder with standard tools, which could yield poor operation and a hazard.

In a preferred embodiment the outer holder comprises a holder body that is made of plastic, fibre-reinforced or otherwise, whereby the mouth is made of metal, preferably steel or aluminium.

As a result, a screw thread on the mouth, needed to be able to fasten an inner holder via the adapter, is not damaged or worn by repeated use, or deformed as a consequence of creep, and the mouth is strengthened so that it does not become an initiation point for defects in the beer keg as a result of the pressure present in the beer keg.

It has to be considered here that such an outer holder is intended to be used in the long term, typically 10 to 20 years, and possibly longer.

In a preferred embodiment the holder also comprises a flexible inner holder that is provided with a coupling element, whereby the coupling element and the adapter are equipped to be coupled together.

Preferably the adapter is provided with a collar on which a coupling for a tap installation of the 'German slider' type can be coupled.

With the same adapter, this enables different types of coupling for a tap installation to be used, at least the EU Sankey and US Sankey couplings, that can both be coupled in an appropriate coupling element on the inner holder, whereby the collar is not in the way, and the German slider that can be coupled on the said collar.

Of course the coupling elements on the inner holders have to be adapted to the different types of coupling for tap installations.

In a further preferred embodiment the adapter and the coupling element are designed to be coupled together by inserting the coupling element in a passage in the adapter, whereby the coupling element can be inserted into the adapter exclusively from the underside of the adapter.

The underside of the adapter is the underside when the holder is assembled and is in an upright position, in other words the side of the adapter that is oriented towards the outer holder.

In this way, by first coupling the inner holder to the adapter from the underside it can prevent the pressurised coupling element from being able to be pushed through the adapter.

In a further preferred embodiment the coupling element and the adapter are fitted with complementary second means to lock their mutual position when they are coupled, whereby this locking is repeatedly reversible.

This has analogous advantages to the locking of the adapter on the outer holder.

In a further preferred embodiment, the adapter is provided with an operating element to operate both the first and the second means, and to bring them from an unlocked state to a locked state and back to an unlocked state.

By using a single operating element the use of the adapter is easy, especially in the event of the automated replacement of the inner holder.

Preferably the adapter is provided with an operating element to operate both the first and the second means, whereby, from a situation in which the first and the second means are both in an unlocked state, a movement of the operating element over a first distance in a direction place the second means in a locked state, and a movement of the operating element in the same direction over a greater distance places the first means in a locked state.

With the intention of better showing the characteristics of the invention, a preferred embodiment of a drink holder according to the invention is described hereinafter by way of an example, without any limiting nature, with reference to the accompanying drawings, wherein.

The drink holder shown in the drawings is a beer keg 1 and consists of the following main components: an outer holder 2, an inner holder 3 that is provided with a coupling element 4 and an adapter 5.

The outer holder 2 essentially consists of a holder body 6 and a mouth 7. The holder body is made of three layers with an HDPE inner layer, a glass-fibre reinforced resin layer as an intermediate layer, and an HDPE outer layer.

The mouth 7 is made of 316 steel and is provided with an internal screw thread. A baseplate 8 is provided around the mouth 7. Two cutaways 9 are made in the baseplate 8.

Two screws 10 are screwed in the holder body 6 through the baseplate 8, whereby the heads 11 of the screws 10 protrude above the baseplate 8.

The inner holder 3 is constructed as a flexible double bag 12, 13 in which a riser pipe 14 for beer is provided. The inner holder 3 is provided with a coupling element 4 to be able to couple the inner holder 3 to the adapter 5, as will be explained later.

Figure 1:
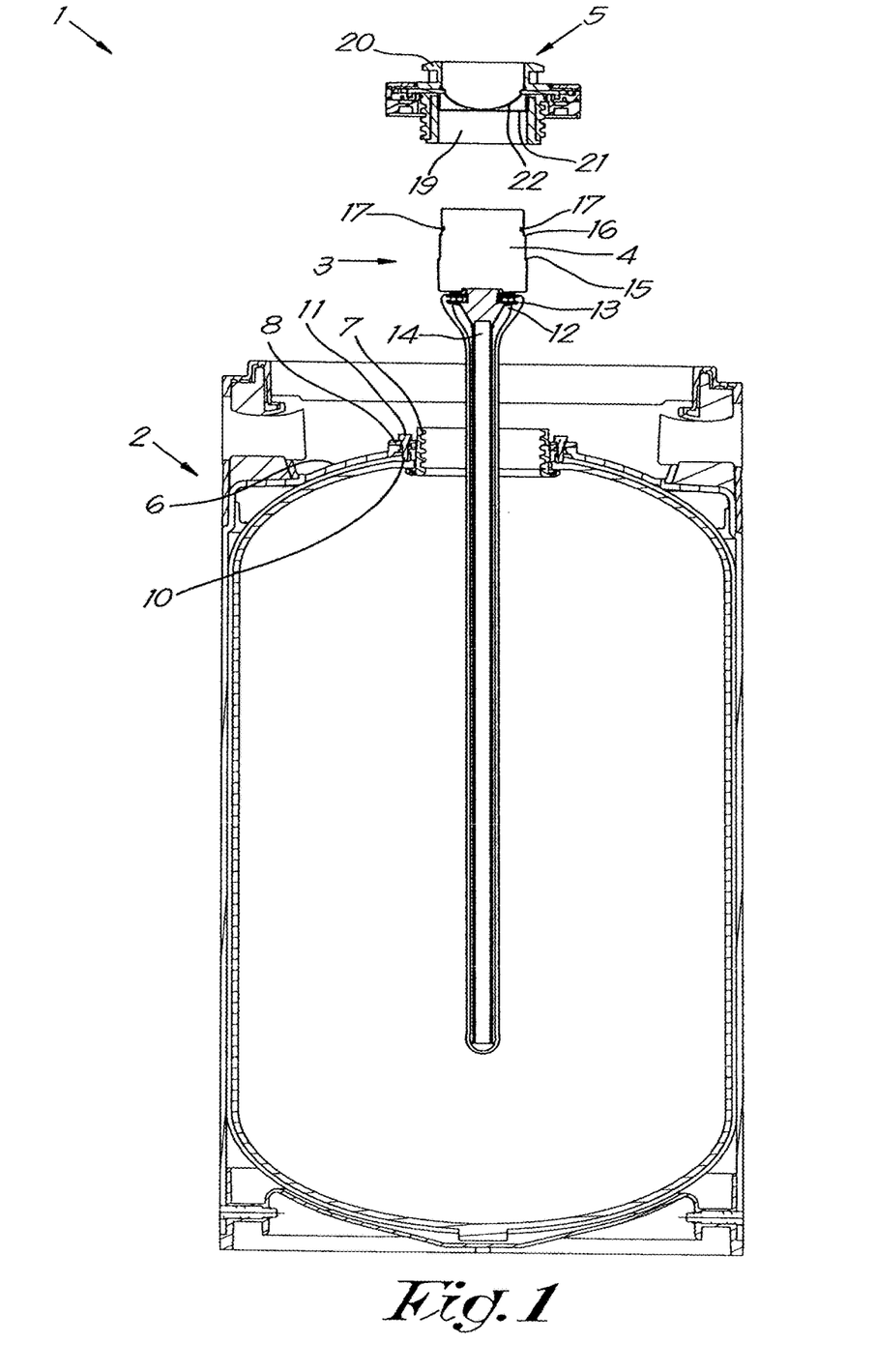
FIG. 1 shows a cross-section of a holder according to the invention in a non-assembled state.
Figure 2:
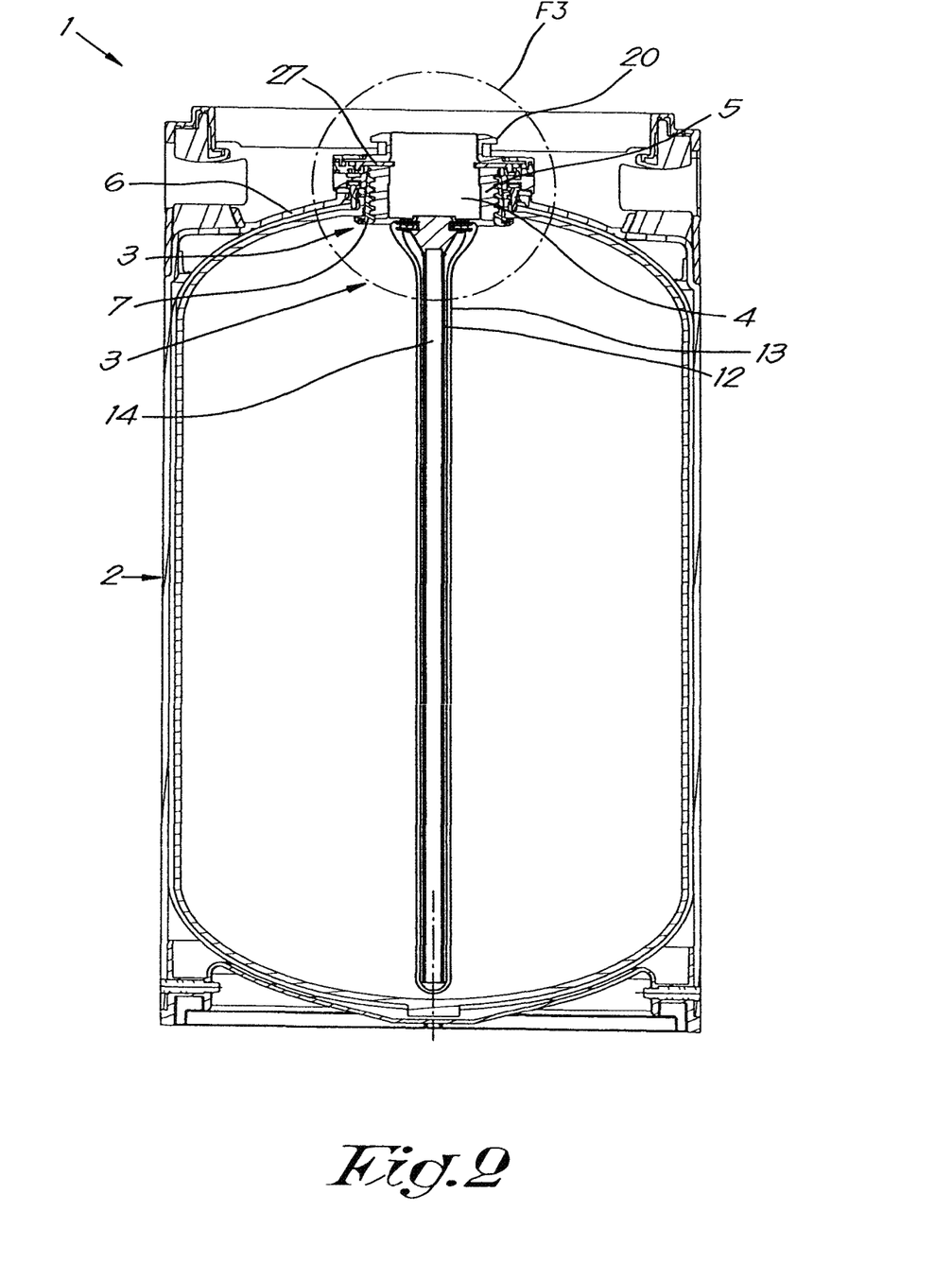
FIG. 2 shows a cross-section of the holder of FIG. 1 in an assembled state.
Figure 3:
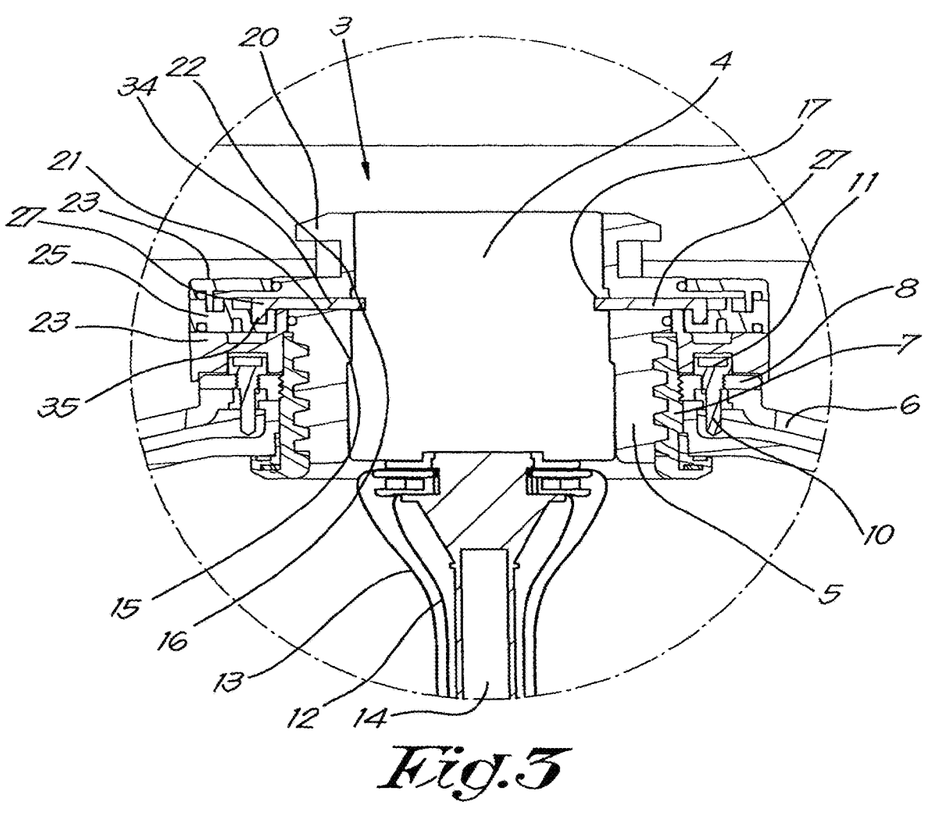
FIG. 3 shows the part indicated by F3 in FIG. 2 on a larger scale.
Figure 4:
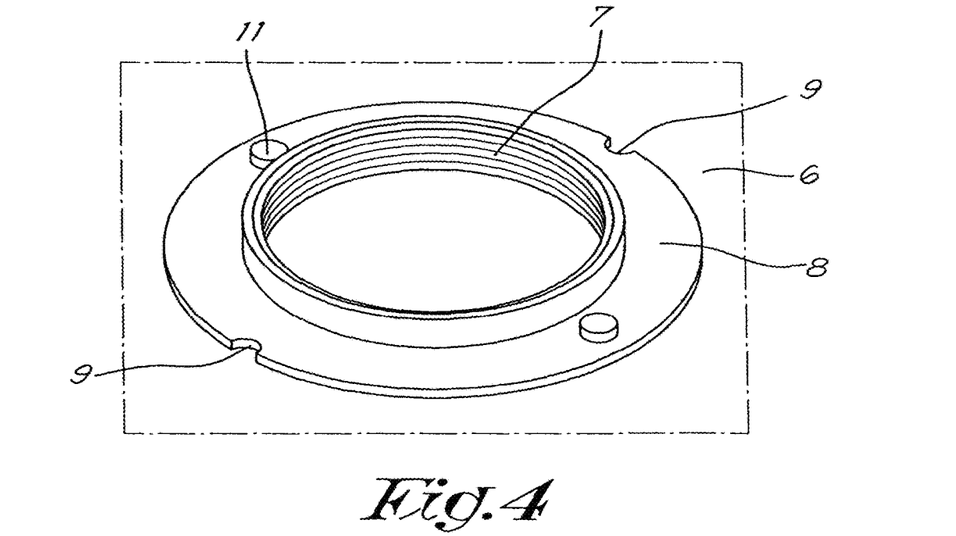
FIG. 4 shows a perspective view of a detail of a part of the holder of FIGS. 1 and 2.

The double bag 12, 13, in a new condition, is folded and/or rolled around the riser pipe 14, as shown in FIGS. 1 and 2.

Valves are integrated in the coupling element 4 to be able to close the inner bag 12 that is intended to contain beer, or connect it, according to choice, to supply pipes or outlet pipes, and to be able to close the space between the two bags 12, 13 that is intended to contain a pressure medium, or connect it, according to choice, to a supply of pressure medium or the atmosphere.

Such valves are well known to the person skilled in the art and are not of particular importance to the present invention, and are thus not shown in the drawings.

The coupling element 4 is provided on its outside with two stepped transitions 15, 16 whereby the thickness of the coupling element 4 decreases, when viewed from the bottom to the top. One of these narrowings 16 is V-shaped with the tip of the V-shape oriented upwards.

The coupling element 4 is equipped on its top to be coupled to a coupling for a tap installation of the 'European Sankey' type.

The coupling element 4 is also provided with two rectangular cutaways 17 that are placed diametrically opposite one another and are open to the outside.

Figure 5:
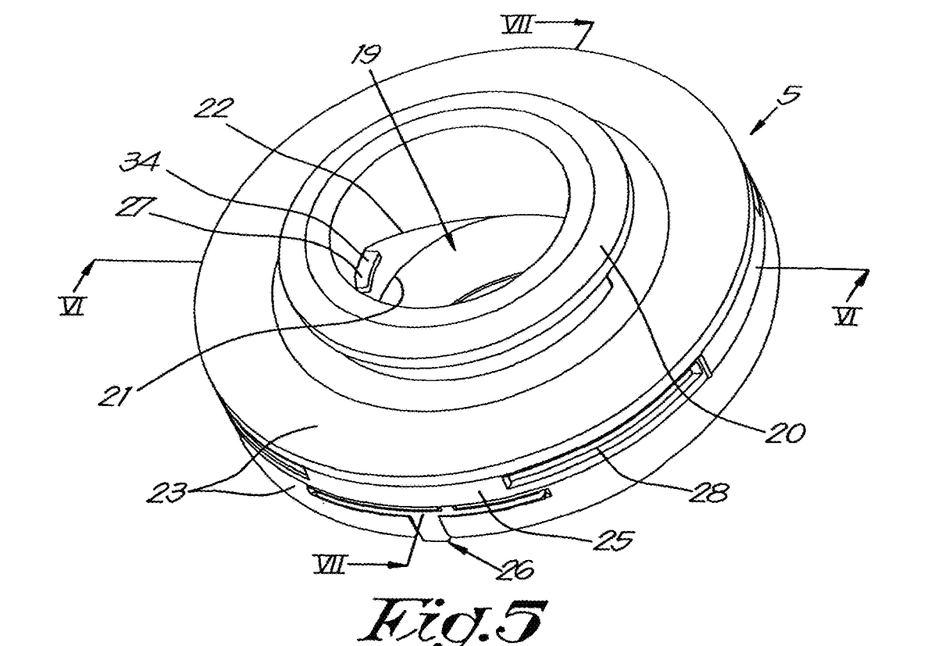
FIG. 5 shows a perspective view of another part of the holder of FIGS. 1 and 2.
Figure 6:
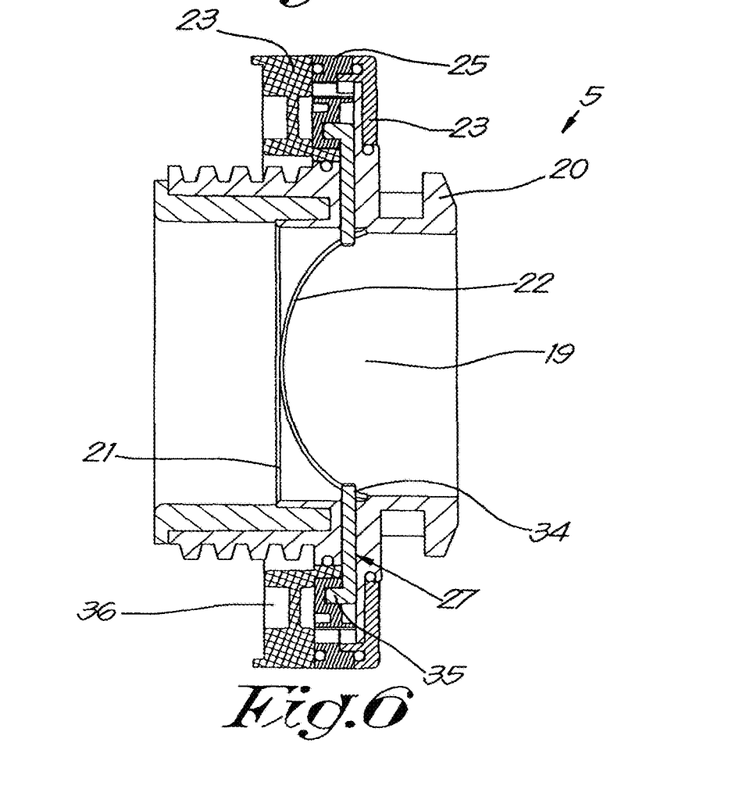
FIGS. 6 and 7 show a cross-section of the part of FIG. 5 according to VI-VI and VII-VII in the assembled state of the holder.
Figure 7:
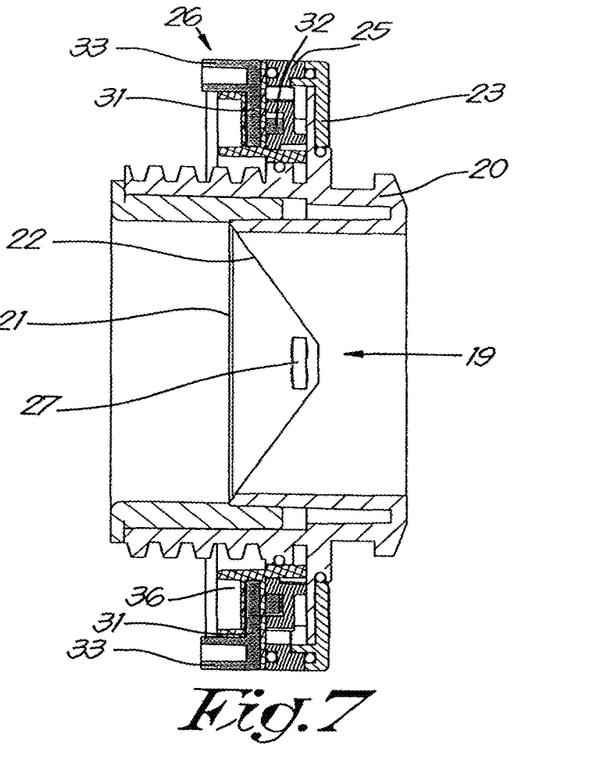

As shown by FIGS. 5 to 7 in particular, the adapter consists of a tubular central section with a central passage 19, around which a ring-shaped locking mechanism is provided. The adapter 5 is essentially made of fibre-reinforced nylon.

The tubular central section is provided on its underside with an external screw thread that fits to the screw thread of the mouth 7 of the outer holder 2. The tubular central section is provided on its top with a collar 20 to be able to couple a German Slider type coupling for a tap installation.

The inside of the central tubular section is constructed with two stepped narrowings 21, 22 viewed from the bottom to the top, whereby one of the narrowings 22 is V-shaped with the tip of the V-shape oriented upwards.

The ring-shaped locking mechanism essentially consists of a housing 23 of several parts in which an operating ring 25 is turnably affixed. This operating ring 25 operates two pairs of locking elements 26, 27. In this example, but not necessarily, the locking elements 26, 27 are made of 316 steel, in contrast to the rest of the adapter.

Figure 8:
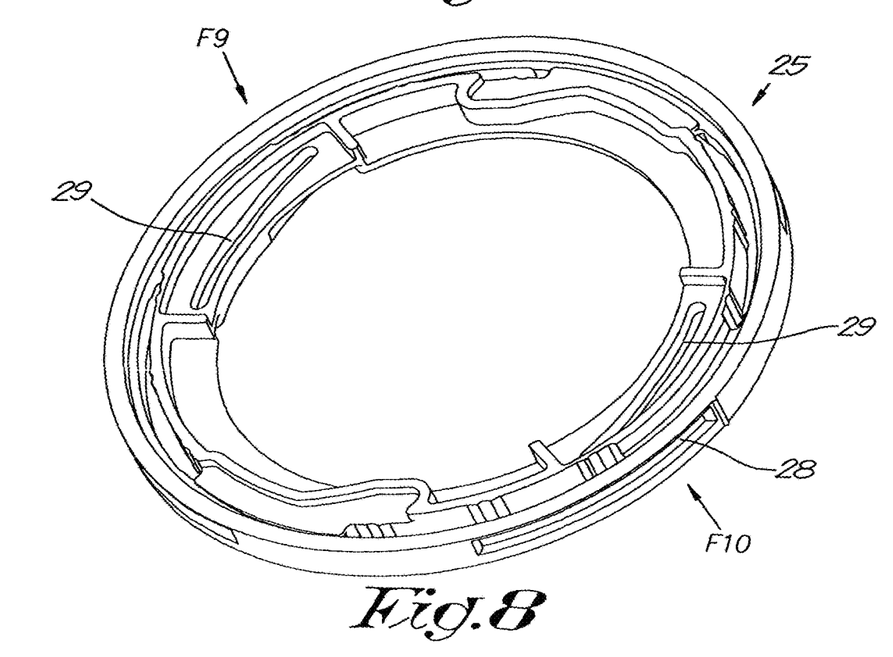
FIG. 8 shows a perspective view of a component of the part of FIG. 5.
Figure 9:
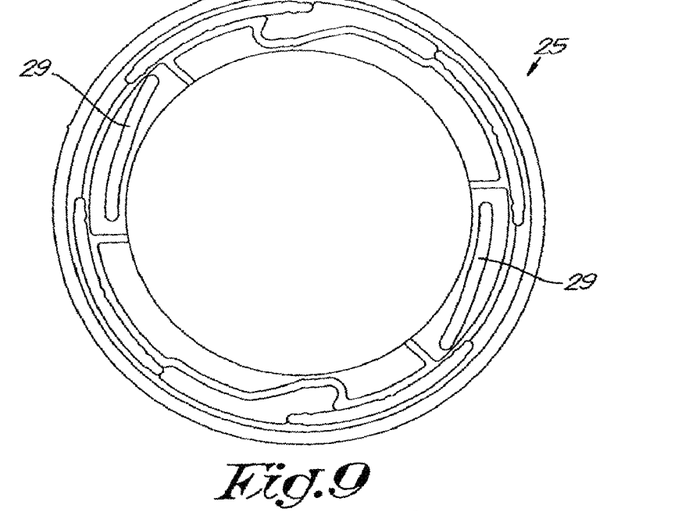
FIG. 9 shows a view of the component of FIG. 8 according to F9.
Figure 10:
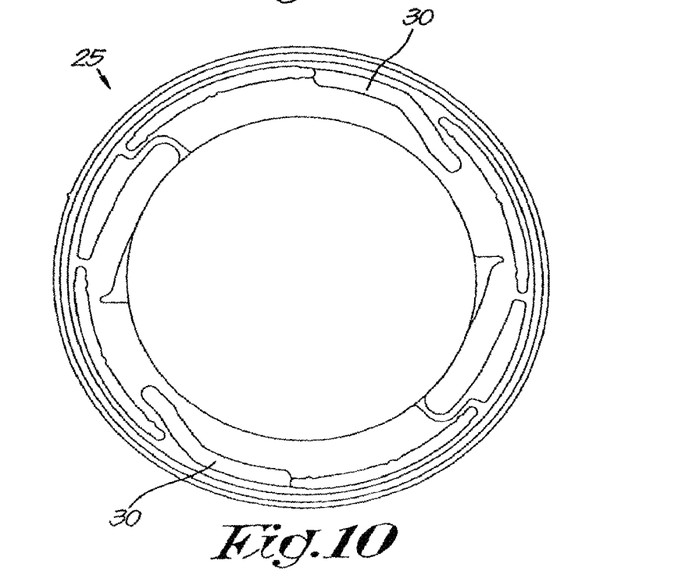
FIG. 10 shows a view of the component of FIG. 8 from the opposite side to FIG. 9, as indicated by F10.

The operating ring 25, which is shown in detail in FIGS. 8 to 10, is sunk into the housing 23 and is provided on its outside with grip slots 28 for a suitable tool.

The operating ring 25 is provided internally with two pairs of slots 29, 30 which have a different distance to the centre of the operating ring 25 over their length, i.e. a first pair of slots 29, which, seen in the clockwise direction in FIG. 10, bend inwards from approximately halfway and reach the shortest distance to the centre near their ends, and a second pair of slots 30, which, seen in the anticlockwise direction, bend inwards from the start of the second slots 30.

It is hereby noted that, because FIGS. 9 and 10 show either side of the same component, clockwise in FIG. 10 corresponds to anticlockwise in FIG. 9.

Figure 11:
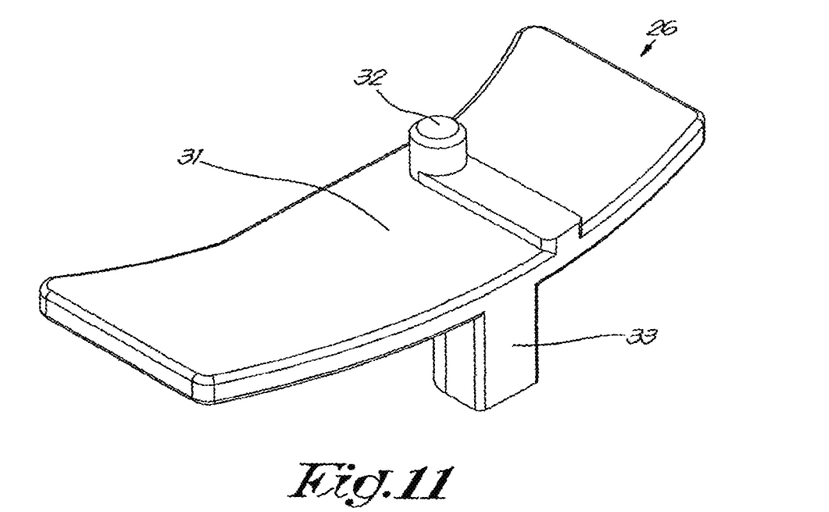
FIGS. 11 and 12 show a perspective view of other components of the part of FIG. 5.
Figure 12:
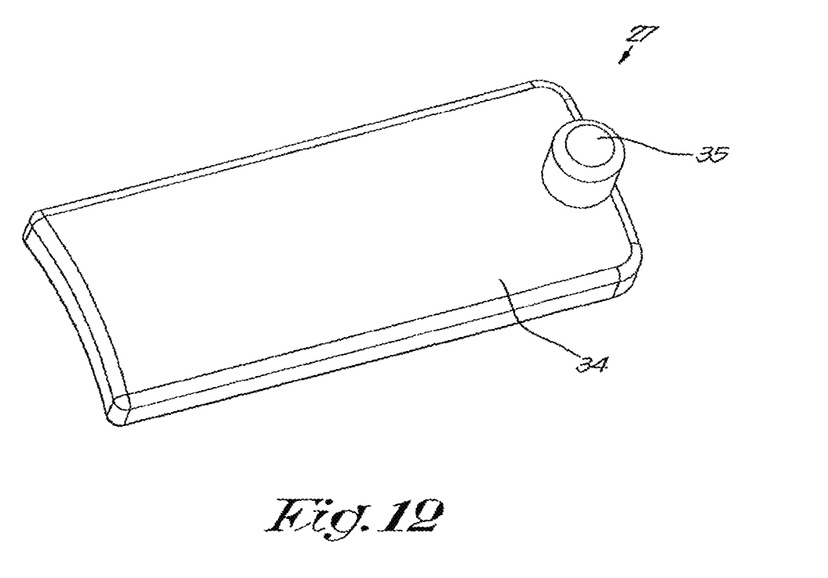
Figure 13:
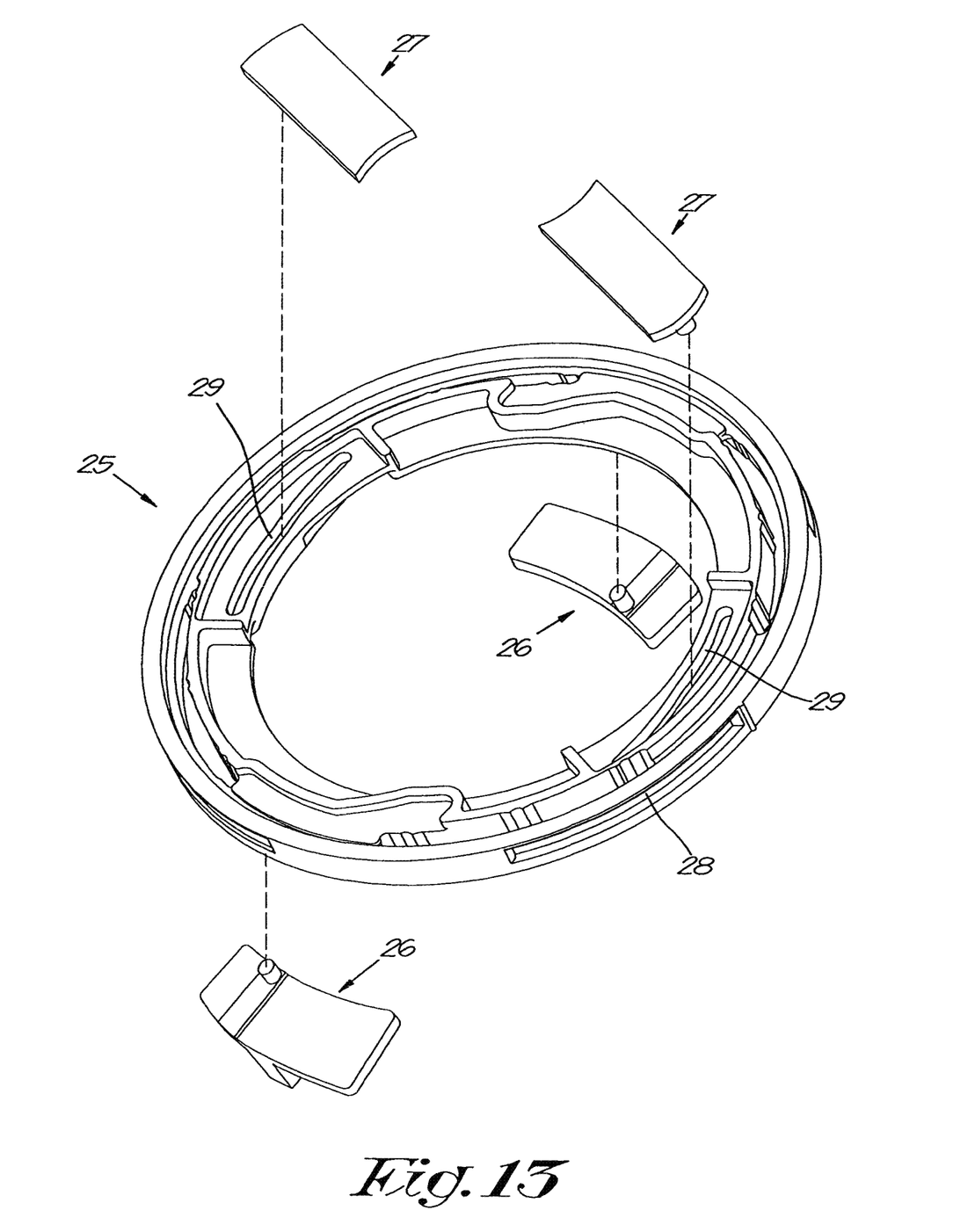
FIG. 13 shows the parts of FIGS. 8, 11 and 12 together as an exploded drawing.

A first pair of locking elements 26, shown in FIG. 11, consists of a small plate 31, with a first catch 32 and a first bolt 33 thereon. The first catches 31 are provided in the first slots 29.

A second pair of locking elements 27 consists of a flat bar 34 that acts as a second bolt, on which a second catch 35 is provided. The second catches 35 are provided in the second slots 30.

The housing 23 is provided on its underside with two semiring-shaped third slots 36.

The use of the beer keg 1 is simple and as follows. It starts in a situation in which both pairs of locking elements 26, 27 are in their outermost position.

A new inner holder 3, including coupling element 4 and riser pipe 14, is introduced with the coupling element 4 into the passage 19 of the adapter 5 from the underside. The double bag 12, 13 is made completely empty when produced and is rolled compactly around the riser pipe 14.

The V-shaped narrowing 22 on the adapter 5 and the V-shaped stepped transition 16 of the coupling element 4 hereby fit together and guide the coupling element 4 to its desired position in the adapter 5.

Thanks to the narrowings 21, 22 on the adapter 5 and the stepped transitions 15, 16 on the coupling element 4, it is impossible for the coupling element to be pushed through the adapter 5, not even later during the use of the beer keg 1 when it is pressurised. This is important for the safety of the beer keg 1 during use.

Using a suitable tool that fits in the grip slots 28, the operating ring 25 is now turned by approximately 22.5°, clockwise in FIGS. 8 and 9, and anticlockwise in FIG. 10.

As a result the two catches 35 slide in the second slots 30 and are pushed inwards. The flat bars 34, i.e. the second bolts, are now pushed in the cutaways 17 in the coupling element 4, such that the coupling element 4 is locked in the adapter 5.

Then the double bag 12, 13 and the riser pipe 14 is slid into the outer holder 2 through the mouth 7. Due to the relatively large diameter of the mouth 7, this can be done without the risk of damage to the double bag 12, 13.

Now the adapter 5, with the inner holder 4 fastened thereto, is screwed in the mouth 7. At the end of the screwing movement the heads 11 of the screws 10 slide through the third slots 36 until they form an end stop for the end of the third slots 36, such that the adapter 5 cannot turn any further.

In this position the cutaways 9 in the baseplate 8 of the mouth 7 and the first bolts 33 are in corresponding positions. Now the operating ring is turned again by approximately 22.5° in the same direction, again using the suitable tool, such that the first catches 32 slide through the first slots 29, and the first locking elements 26 are pushed inwards, so that the first bolts 33 catches are pushed in the cutaways 9 in the baseplate 8. The adapter 5 is now locked on the outer holder 2.

Now a filling installation can be connected to the coupling element 4 and/or the adapter 5 in a traditional way, so that the inner holder 3 can be filled with beer. Hereby there is no risk of contamination of the beer with dirt, because the inner holder 3 is completely new. The beer keg 1 can now be used.

When it is empty, it can be reused by first pumping out any contaminated beer residues, and if need be by evacuating the space between the two bags 12, 13.

The assembly operations described above are now performed in the reverse order, whereby if the space between the two bags 12, 13 is not evacuated, the inner holder 3 can nonetheless be easily removed by pulling the adapter 5 with the inner holder 3 a short distance out of the outer holder and then making a cut in the bags 12, 13, so that remaining propellant can escape.

The inner holder 3 is now discarded.

The outer holder 2 and the adapter 5 are now ready for reuse. In principle they have not been in contact with beer residues, and in a subsequent usage cycle they will not come into contact with fresh beer either, thus they do not have to be cleaned. Nevertheless, cleaning can of course be done if this is considered desirable.

The present invention is by no means limited to the embodiments described as an example and shown in the drawings, but a holder according to the invention can be realised in all kinds of forms and dimensions without departing from the scope of the invention.

The invention claimed is:

1. A holder comprising:
   a rigid outer holder comprising a mouth;
   a flexible inner holder comprising a coupling element, wherein the mouth of the rigid outer holder is configured to receive the flexible inner holder; and
   an adapter that is configured to be provided on the mouth and that is configured to be coupled to the coupling element of the inner holder,
   thereby allowing the inner holder, with the coupling element that is too small to be provided on the mouth directly to be provided on the mouth,
   wherein:
   the coupling element and the adapter are configured to be coupled together, and
   the outer holder and the adapter are fitted with a complementary first lock that locks their relative position when they are coupled, whereby the locking is repeatedly reversible.

2. The holder according to claim 1, wherein the adapter comprises a collar to which a coupling for a tap installation of the 'German Slider' style can be coupled.

3. The holder according to claim 1, wherein the adapter and the coupling element are designed to be coupled together by inserting the coupling element into a passage in the adapter, whereby the coupling element can be inserted into the passage exclusively from the underside of the adapter.

4. The holder according to claim 1, wherein the coupling element and the adapter are fitted with a complementary second lock in order to lock their mutual position when they are coupled, whereby the locking is repeatedly reversible.

5. The holder according to claim 4, wherein the adapter is provided with an operating element to operate both the first lock and the second lock and to bring them from an unlocked state to a locked state and back to an unlocked state.

6. The holder according to claim 5, wherein the adapter is provided with an operating element to operate both the first lock and the second lock, whereby, from a situation in which the first lock and the second lock are both in an unlocked state, a movement of the operating element over a first distance in a direction brings the second lock to a locked state, and a movement of the operating element in the same direction over a greater distance brings the first lock to a locked state.

7. The holder according to claim 5, wherein the operating element is ring-shaped, whereby the first lock comprises the following components:
   at least one first slot in the operating element that has different distances to the center of the operating element over its length;
   at least one first bolt that is connected to a first catch that is placed in the first groove, so that by turning the operating element the first bolt is given a radial movement, and
   at least one first cutaway in the outer holder to receive the first bolt,
whereby the second lock comprises the following components:
   at least one second slot in the operating element that has different distances to the center of the operating element over its length;

at least one second bolt that is connected to a second catch that is placed in the second slot, so that by turning the operating element the second bolt is given a radial movement, at least one second cutaway in the coupling element to receive the second bolt.

8. The holder according to claim 1, wherein the outer holder comprises a holder body that is made of plastic, fiber-reinforced or otherwise, whereby the mouth is made of fiber-reinforced plastic or metal.

9. The holder of claim 8, wherein the mouth comprises at least one of steel, aluminum and a zinc alloy.

10. A holder comprising:

a rigid outer holder comprising a mouth; and an adapter provided on the mouth;

wherein:

the mouth of the rigid outer holder is configured to receive a flexible inner holder that comprises a coupling element, and the adapter is configured to be coupled to the coupling element of the inner holder, thereby allowing the inner holder, with the coupling element that is too small to be provided on the mouth directly to be provided on the mouth, wherein the outer holder and the adapter are fitted with a complementary first lock that locks their relative position when they are coupled, whereby the locking is repeatedly reversible.

* * * * *